United States Patent [19]

Zave

[11] Patent Number: 5,737,403
[45] Date of Patent: Apr. 7, 1998

[54] INTERACTION OF ROUTING FEATURES IN A TELEPHONE SYSTEM

[75] Inventor: Pamela Zave, Chatham, N.J.

[73] Assignee: AT&T Corp., Middletown, N.J.

[21] Appl. No.: 528,900

[22] Filed: Sep. 15, 1995

[51] Int. Cl.$^6$ .................................................. H04M 3/42
[52] U.S. Cl. ........................ 379/211; 379/201; 379/210; 379/243
[58] Field of Search .................................. 379/201, 207, 379/210, 211, 212, 242, 243, 196, 219, 220, 221

[56] References Cited

U.S. PATENT DOCUMENTS

| | | | |
|---|---|---|---|
| 5,386,464 | 1/1995 | Pruitt | 379/201 |
| 5,467,388 | 11/1995 | Redd, Jr. et al. | 379/211 |
| 5,481,602 | 1/1996 | Griffiths et al. | 379/211 |
| 5,530,931 | 6/1996 | Cook-Hellberg et al. | 379/211 |
| 5,548,636 | 8/1996 | Bannister et al. | 379/211 |
| 5,553,128 | 9/1996 | Grimes | 379/211 |
| 5,592,541 | 1/1997 | Fleischer, III et al. | 379/211 |
| 5,623,536 | 4/1997 | Solomon et al. | 379/211 |
| 5,654,961 | 8/1997 | Araujo et al. | 379/211 |

OTHER PUBLICATIONS

"A Practical Approach to Service Interactions", Eric B. Kuisch et al., *IEEE Communications Magazine*, Aug. 1993, pp. 24–31.

"Methods of Addressing the Interactions of Intelligent Network Services With Embedded Switch Services", Seth Homayoon et al., *IEEE Communications Magazine*, Dec. 1988, pp. 42–46, 70.

"Managing Run–Time Interactions Between Call–Processing Features", Michael Cain, *IEEE Communications Magazine*, vol. 30, No. 2, Feb. 1992, pp. 44–50.

"Administrable Feature Interaction Concept", L. Schessel, ISS '92, vol. 2, Oct. 1992, pp. 122–126.

"Service and Service Feature Interaction: Service Creation, Service Management and Service Execution Aspects", J. Muller, *France Telecom CNET*, Section 1 to 6.3.

"Feature Interactions in Telecommunications Systems", L. G. Bouma and H. Velthuijsen, *IOS Press*, 1994, pp. 60–72.

"Formalisation of a User View of Network and Services for Feature Interaction Detection", Pierre Combes, Simon Pickin, *IOS Press*, 1994, pp. 120–135.

*Primary Examiner*—Krista Zele
*Assistant Examiner*—Scott Wolinsky

[57] ABSTRACT

Techniques for analyzing interactions of call routing features in a telephone system and implementing the features. Analysis and implementation are based on the recognition that a customer intends a call routing feature to apply to a telephone number which represents either a subscriber to which a call should be routed or a telephone number to which a call should be routed. From this recognition flow two classes of routing features: telephone features, which apply to telephone numbers representing telephones, and subscriber features, which apply to telephone numbers representing subscribers. How a given feature interacts with other routing features depends upon which of of the two classes it belongs to. Routing features may be implemented by keeping track of a telephone number which functions as a subscriber pointer and of one which functions as a telephone pointer and recursively invoking functions for subscriber and telephone features. The recursive invocations permit forwarding chains of any length. The techniques have also led to the development of a number of new call forwarding and call blocking features.

35 Claims, 6 Drawing Sheets

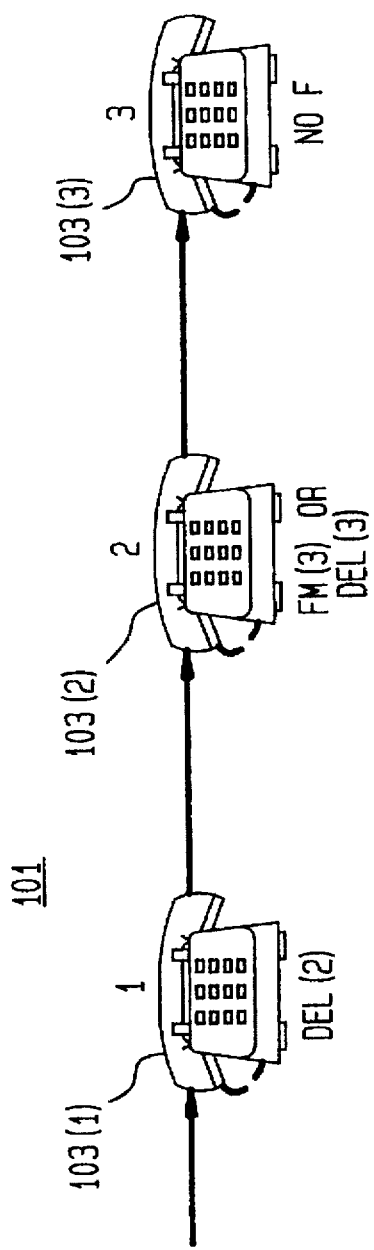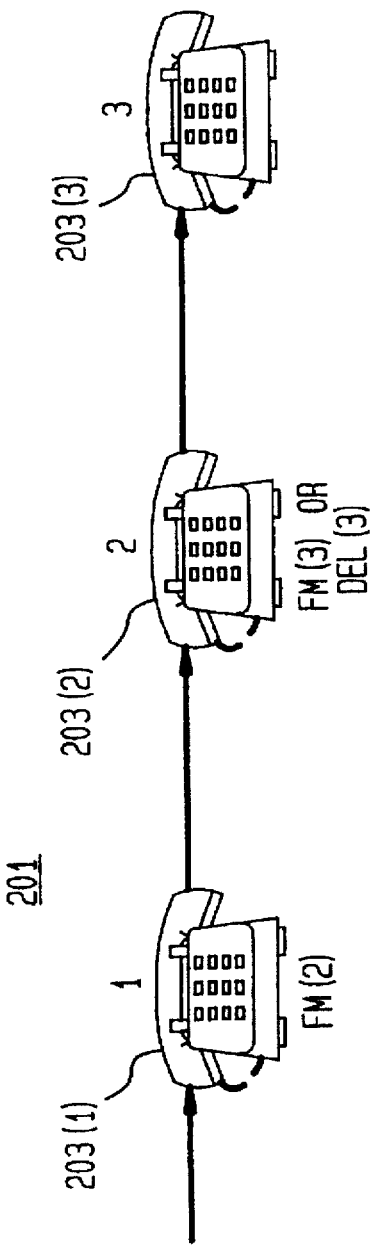

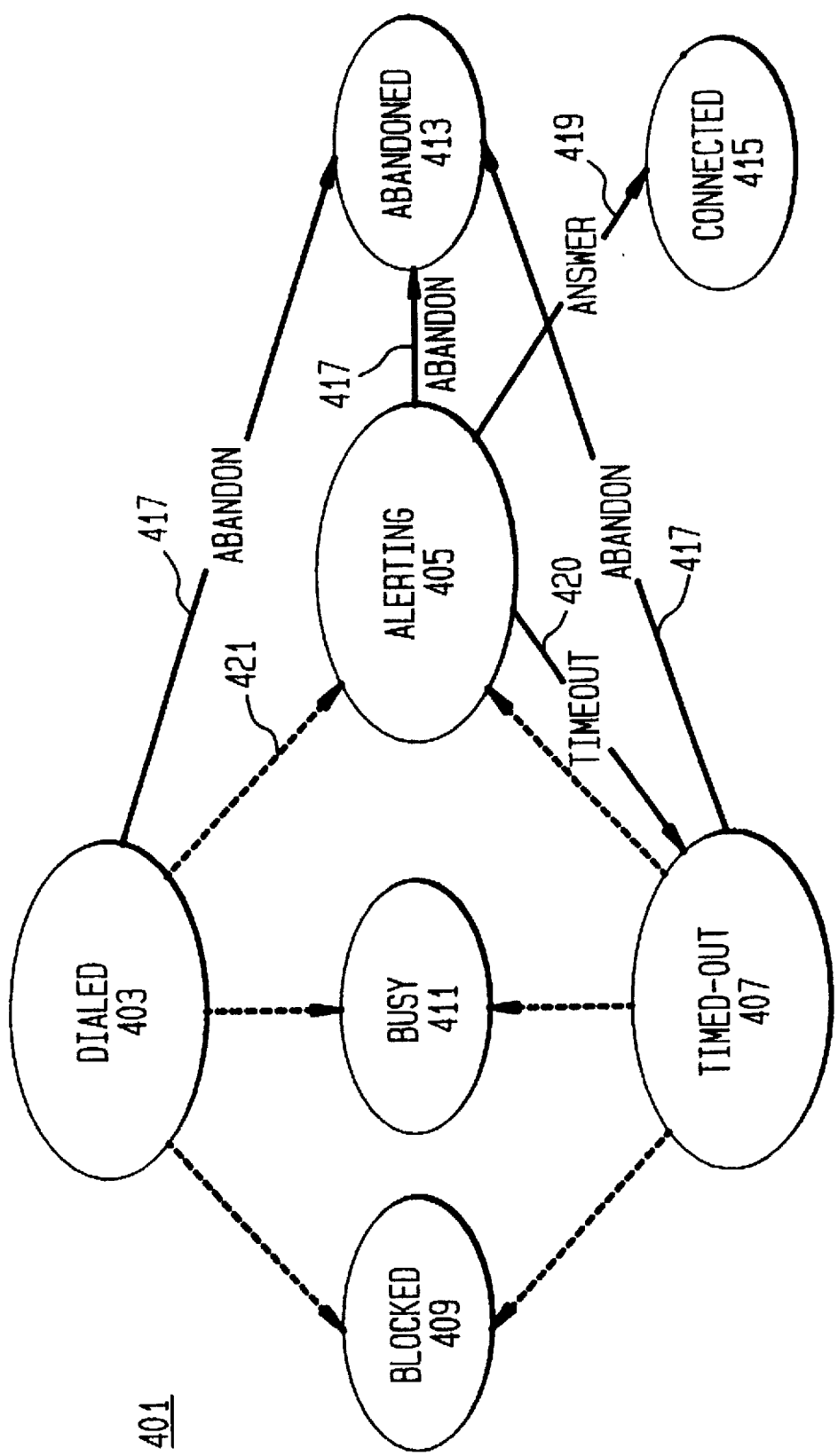

| CASE | OF...subscriber-outcome (old-subs) = (new-state,new-tel,new-subs) | | |
|---|---|---|---|
| | | subscriber-outcome (Del (old-subs)) | |
| 1 | old-subs ∈ dom Del | telephone-outcome (FM(old-subs), old-subs) | |
| 2 | old-subs ∈ dom FM | | |
| 3 | true | telephone-outcome (old-subs, old-subs) | |

503

| CASE | OF..telephone-outcome (old-tel,old-subs) = (new-state,new-tel,new-subs) | | |
|---|---|---|---|
| 1 | POTS(old-tel) ∈ Busy ∧ old-subs ∈ dom DelB | subscriber-outcome (DelB (old-subs)) | |
| 2 | POTS(old-tel) ∈ Busy | (busy, old-tel, old-subs) | |
| 3 | old-subs ∈ dom DelNA | (quick-alerting, old-tel, old-subs) | |
| 4 | old-subs ∈ dom FMNA ∧ old-tel=old-subs | (quick-alerting, old-tel, old-subs) | |
| 5 | true | (alerting, old-tel, old-subs) | |

505

| CASE | OF timeout-outcome (old-tel, old-subs) = (new-state, new-tel, new-subs) | | |
|---|---|---|---|
| 1 | old-subs ∈ dom DelNA | subscriber-outcome (DelNA (old-subs)) | |
| 2 | old-subs ∈ dom FMNA ∧ old-tel=old-subs | telephone-outcome (FMNA(old-subs) . old-subs) | |
| 3 | true | (alerting, old-tel, old-subs) | |

| CASE | OF...subscriber-outcome(old-subs) = (new-state, new-subs) | |
|---|---|---|
| 1 | (origin,old-subs) ∈ Block-Route-through | (blocked, old-subs, old-subs) |
| 2 | old-subs ∈ dom Del | subscriber-outcome (Del(old-subs)) |
| 3 | (origin,old-subs) ∈ Block-subscriber | (blocked, old-subs, old-subs) |
| 4 | old-subs ∈ dom FM | telephone-outcome (FM(old-subs), old-subs) |
| 5 | true | telephone-outcome (old-subs, old-subs) |

903

| CASE | OF...telephone-outcome(old-tel, old-subs) = (new-state, new-subs) | |
|---|---|---|
| 1 | (origin,old-tel) ∈ Block-Route-Through | (blocked, old-tel, old-subs) |
| 2 | POTS(old-tel) ∈ Busy ∧ old-subs ∈ dom DelB | subscriber-outcome (DelB(old-subs)) |
| 3 | (origin,old-tel) ∈ Block-Telephone | (blocked, old-tel, old-subs) |
| 4 | POTS(old-tel) ∈ Busy | (Busy, old-tel, old-subs) |
| 5 | old-subs ∈ dom DelNA | (quick-alerting, old-tel, old-subs) |
| 6 | old-subs ∈ dom FMNA ∧ old-tel=old-subs | (quick-alerting, old-tel, old-subs) |
| 7 | true | (alerting, old-tel, old-subs) |

905 907 909 911

INTERACTION OF ROUTING FEATURES IN A TELEPHONE SYSTEM

BACKGROUND OF THE INVENTION

1. Field of the Invention

The invention concerns telephone systems generally and more specifically concerns routing features employed in telephone systems.

2. Description of the Prior Art

In telephony, the term feature is used for a function of the telephone system which goes beyond the ordinary telephone system functions of providing a dial tone in a first telephone, responding to a telephone number dialed in the first telephone by setting up a call to a second telephone specified in the telephone number, returning a busy signal if the second telephone is busy, and otherwise ringing the second telephone and connecting the first and second telephones if the second telephone is answered. The above ordinary telephone system functions are often denoted herein by the acronym POTS (Plain Old Telephone Service).

One general class of features is routing features: the telephone system automatically does something with a call directed to a given telephone other than simply setting up the call to the given telephone. One example of a routing feature is call forwarding: the user of a given telephone specifies another telephone to the telephone system and the telephone system automatically reroutes a call to the given telephone to the other telephone. In telephone parlance, the telephone system automatically reroutes the call from the directory number (DN) of the given telephone to the DN of the other telephone. Another example is call blocking: the user of a given telephone specifies another telephone from which the given telephone is not to receive calls and the telephone system does not set up calls from the other telephone to the given telephone.

Call routing features are both useful and popular; a continuing problem with them, however, has been defining how they interact with each other. For example:

Example 1: Directory number (DN) $d_1$ is forwarded to DN $d_2$, and $d_2$ is forwarded to $d_3$. Should a call to $d_1$ be routed to $d_2$ or $d_3$?

Example 2: $d_1$ is forwarded to $d_2$. What happens to calls to $d_1$ when Do Not Disturb (DND) applies to $d_1$ and not to $d_2$? When DND applies to $d_2$ and not to $d_1$?

Example 3: The subscriber of $d_1$ subscribes to Originating Call Screening (OCS, also known as Outgoing Call Barring and Can Restriction) and has used it to block calls to $d_2$. His child's friend at $d_3$ sets up forwarding from $d_3$ to $d_2$, and his child calls $d_3$. Should the call go through?

Example 4: The subscriber of $d_1$ subscribes to OCS and has used it to block calls to $d_2$. Calls from $d_2$ are forwarded to $d_3$. Should a call from $d_1$ to $d_2$ go through?

These and other questions about the interaction of routing features have yet to be answered in any consistent manner. In the absence of answers, the following solutions have been suggested:

1. The open questions about routing behavior can be left open as options, and subscribers can make their own choices. See in this regard Jacques Muller, "Service and service feature interaction: Service creation, service management, and service execution aspects," ETSI/NA6 Working Document, March, 1994. It seems unfair to ask subscribers to understand and answer questions that telecommunications experts cannot.

2. The behavior can be determined by negotiation at the time of call setup. See Nancy Griffeth and Hugo Velthuijsen, "The negotiating agent model for rapid feature development", in: *Proceedings of the Eighth International Conference on Software Engineering for Telecommunications Systems and Services*, pp. 67–71, Institution of Electrical Engineers, London, 1992. If the negotiating agent is the subscriber, this would seem to add greatly to setup overhead and to the intellectual burden on the subscriber, as well as establishing a number of new covert signalling channels. If the negotiating agent is a program, then this proposal is just a new way of implementing features, and brings no new insight to the question of how features should behave.

3. The behavior can be determined by arbitrary and subjective choices. This is intellectually unsatisfying and the arbitrary and subjective nature of the choices will necessarily complicate system behavior and implementation.

It is an object of the present invention to solve the above and other problems of call routing features by providing call routing features which are defined in such a fashion that detailed questions concerning the behavior of the features and their interactions with other features can be easily and predictably answered.

SUMMARY OF THE INVENTION

The solution to the above problems of call routing features is to base the analysis of call routing features on the human situations which motivate the users of the features to purchase and activate them. When this is done, it turns out that the interaction of call routing features depends on whether the feature is one of a class of telephone features or one of a class of subscriber features. In features which belong to the first class, the feature is applied to a telephone number which represents a telephone for purposes of the feature; in those which belong to the second class the feature is applied to a telephone number which represents a subscriber for purposes of the feature.

For example, if a first user expects to be at a different telephone number, and activates a feature to forward his calls to that different telephone number, the first user wants his telephone calls to reach him at that telephone number. The usual user of the telephone number may have activated forwarding features for that telephone number, but these forwarding features are simply not relevant to the call forwarding operation.

The feature which behaves the way the first user wants is a telephone feature which is activated for the first user's usual number and applies to the different telephone number. Here, the different telephone number represents the telephone at which the first user wants to be reached, not the subscriber to whom the different telephone belongs. Because the feature is a telephone feature instead of a subscriber feature, the telephone system forwards calls from the user's usual telephone number to the telephone number to which the feature applies, but does not take the features activated for the different telephone number into account in further forwarding operations for the call.

On the other hand, if a first user simply wants a second user to handle his calls and activates a feature to forward his calls to the telephone normally used by the second user, the first user does not care what telephone number the second user receives the calls at. Consequently, the forwarding features which the second user may have activated for his telephone are relevant to the call forwarding operation.

In this case, the feature which behaves the way the first user wants is a subscriber feature which is activated for the first user's telephone number and applies to the second user's normal telephone number. Here, the second user's telephone number represents the subscriber whom the first user wants to handle the first user's telephone, not the telephone to which the different telephone number belongs. Because the feature is a subscriber feature, the telephone system not only forwards the first user's call to the second user's telephone number, but also forwards it from the second user's telephone number as indicated by the forwarding features activated for that telephone number.

When call routing is implemented according to the above principles, each routing step is performed by determining whether each feature which is relevant to the routing step is a telephone feature or a subscriber feature and determining how to route the call according to how the features are classified.

The call routing features which can be implemented according to the above principles include several varieties of call blocking. A call blocking feature may be a telephone feature or a subscriber feature and how the blocking is done depends upon which class the blocking feature belongs to.

For example, if a user wants a call blocking feature which simply blocks all calls to the user's telephone, the desired blocking feature is a telephone feature which is activated for and applies to the user's telephone. On the other hand, if the user wants a feature which blocks all calls intended for him but permits calls that his housesitter has forwarded to his telephone number from the housesitter's phone by means of a telephone feature, the desired blocking feature is a subscriber feature, i.e., one which blocks all calls except those which were routed in the previous step by a telephone feature.

The foregoing and other objects and advantages of the invention will be apparent to one of ordinary skill in the art who peruses the following Drawing and Detailed Description, wherein:

BRIEF DESCRIPTION OF THE DRAWING

FIG. 1: FIG. 1 is a first example of call forwarding;

FIG. 2: FIG. 2 is a second example of call forwarding;

FIG. 3 is a block diagram of the techniques disclosed herein;

FIG. 4: FIG. 4 is a partial diagram of a finite state automaton for call processing;

FIG. 5: FIG. 5 is a tabular representation of a preferred embodiment of call forwarding;

FIG. 6 is a third example of call forwarding;

FIG. 7 is a first example of call forwarding with call blocking;

FIG. 8 is a second example of call forwarding with call blocking; and

FIG. 9: FIG. 9 is a tabular representation of a preferred embodiment of call forwarding with call blocking.

Figure 3:
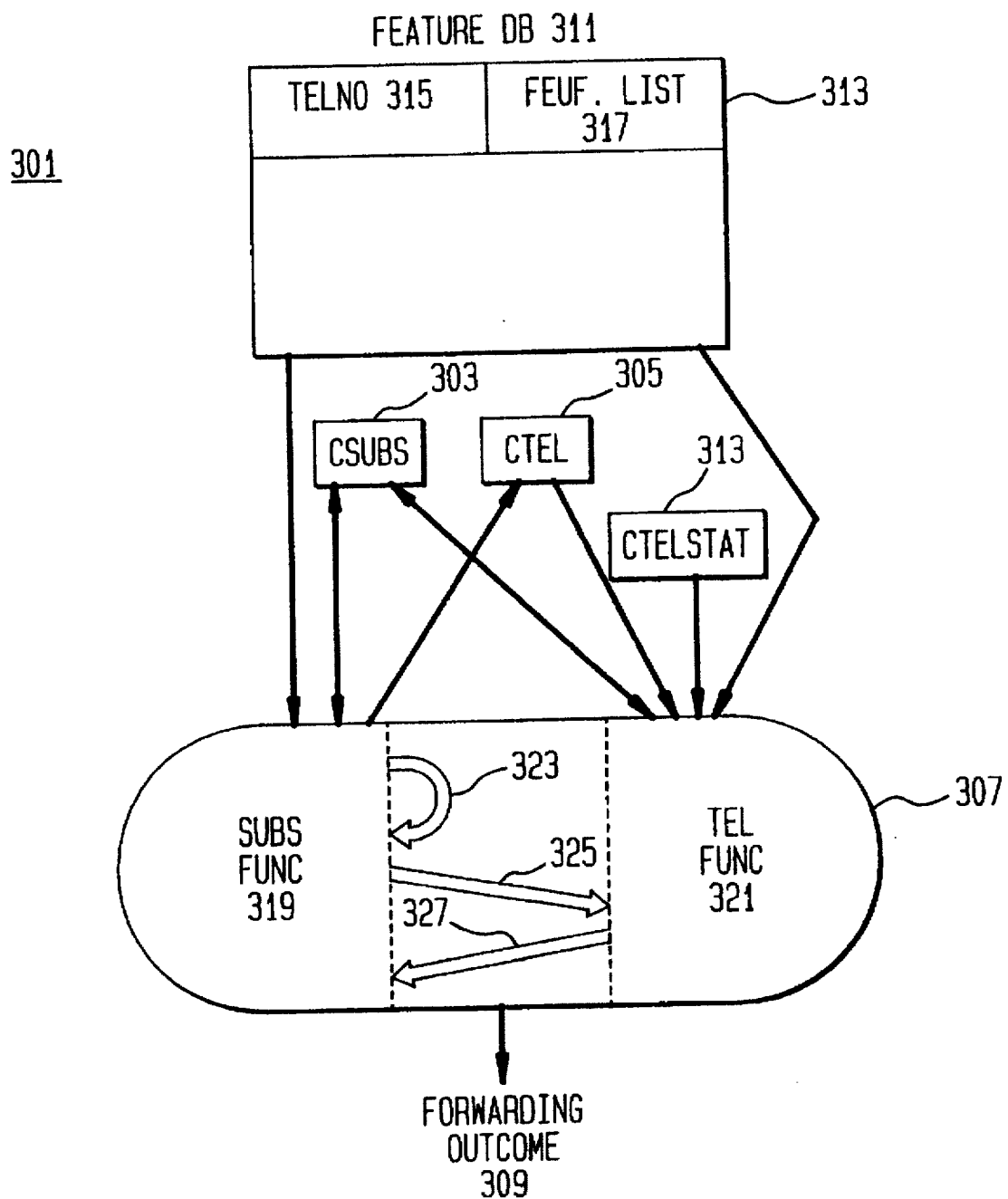
FIG. 3.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first discuss how the principle of designing call routing features from the point of view of the situation of the forwarder when he or she activates the feature can be applied to call forwarding features and then will discuss how it can be applied to call blocking features. Each discussion will begin with an informal description of the novel features and will then provide a formal specification of them in the well-known Z notation described in J. M. Spivey, *The Z Notation: A Reference Manual (Second Edition)*, Prentice-Hall International, 1992.

Situational Analysis of Call Forwarding Features:
FIGS. 1-3

With the novel call forwarding features, the observation upon which their specification is based is that a user who activates a call forwarding feature (the forwarder) is in one of two situations:

He or she wants to delegate the handling of the forwarded calls to another entity, for example, a colleague, a secretary, or an answering service.

He or she wants the forwarded calls to follow him or her to a different telephone.

From this observation emerge two classes of call forwarding features, delegate call forwarding features, in which the forwarder who activates the feature intends to delegate the handling of the forwarded call, and follow me call forwarding features, in which the forwarder intends to have the calls follow the forwarder to a different telephone. All the usual varieties of call forwarding, for example Call Forwarding Unconditional, Call Forwarding on Busy, and Call Forwarding on No Answer, can be understood as belonging to one or the other of these classes, and an understanding of the two classes leads to new kinds of call forwarding features.

Within the telephone system, both the person and the telephone are represented by telephone numbers and the difference between delegate forwarding and follow me forwarding comes down to whether the telephone number to which the call is to be forwarded (the forwarded to) represents a person or a telephone. In the case of delegate forwarding, the forwarded-to telephone number is a key or pointer to the person who normally receives calls at the forwarded-to telephone number. This person is termed herein the subscriber for the telephone number. In the case of delegate forwarding, the forwarded-to telephone number is a key or pointer to a specific telephone.

A call forwarding feature may thus be described in terms of two telephone numbers: the telephone number for which the feature is activated and the forwarded-to telephone number. In call forwarding features, the forwarded-to telephone number is the telephone number to which the feature applies.

FIGS. 1 and 2 show how the classification of call forwarding features into follow-me and delegate features solves the problem posed in example 1 of the Description of the Prior Art. FIG. 1 shows call forwarding arrangement 101. In the arrangement, delegate forwarding has been activated for telephone 103(1) and applied to telephone 103(2), as indicated by DEL(2). For telephone 103(2), either delegate forwarding (DEL(3)) or follow-me forwarding (FM(3)) has been activated and applied to telephone 103(3). Telephone 103(3) has no call forwarding activated ($N_0F$). FIG. 2 shows call forwarding arrangement 201. In the arrangement, follow-me forwarding FM(2) has been activated for telephone 203(1) and applied to telephone 203(2). For telephone 203(2), either delegate forwarding (DEL(3)) or follow-me forwarding (FM(3)) has been activated and applied to telephone 203(3).

In activating delegate forwarding in telephone 103(1) of FIG. 1, the subscriber for telephone 103(1) is indicating that he or she wants the subscriber for telephone 103(2) to take the subscriber's telephone calls; consequently, if the subscriber for telephone 103(2) has activated either follow-me forwarding or delegate forwarding, the call will be forwarded, in this case to telephone 103(3), as shown in the figure.

In activating follow me forwarding in telephone 203(1) of FIG. 2, on the other hand, the subscriber for telephone 203(1) is indicating that he or she wishes to personally take his or her calls at telephone 203(2); consequently, the fact that the subscriber of telephone 203(2) has activated a call forwarding feature is not relevant and telephone 203(2) will not forward the call to 203(3), again as shown in the figure.

Call forwarding which works as shown in FIGS. 1 and 2 can be achieved by maintaining two pieces of information for the call: a directory number which serves as a pointer to a subscriber (the subscriber pointer) and a directory number which serves as a pointer to a telephone (the telephone pointer). As will be explained in more detail below, the call forwarding algorithm updates these pointers in such fashion that at each telephone number (the current telephone number) in the chain of numbers through which the call is being forwarded, the pointers contain the telephone numbers needed to determine what forwarding features are activated for the current telephone number and where relevant for the next step, what forwarding features apply to the current telephone number. The forwarding algorithm then uses this information, together with the current POTS state of the current telephone number, to route the call. For example, if the current telephone number has delegate forwarding activated but has follow-me forwarding applied to it, the forwarding algorithm will ignore the delegate forwarding.

As will also be explained in more detail in the following, call forwarding that works as described above can be implemented by means of a set of recursive functions. Each invocation of a function in the set corresponds to a forwarding of the call to another telephone and the recursion permits a forwarding chain of any length.

FIG. 3 is a schematic representation of a call forwarding system using the principles explained above. Call forwarding system 301 is implemented in call forwarding software 307 executing on a processor in a switch or a customer premises device. In the Figure, data is represented by boxes, with single arrows indicating the flow between the data and the software. Code is represented by an oval, with double arrows indicating invocations of other code components.

Call forwarding software 307 employs three variables: CSUBS 303's value is the subscriber pointer; CTEL 305's value is the telephone pointer; and CTELSTAT 313's value indicates whether the telephone line identified by the current value of CTEL 305 is busy. Data on the features is contained in a features activation data base 311 which has an entry 313 for each telephone number 315 that contains a feature list 317 which indicates what features, if any, are activated for the telephone number 315.

Execution of call forwarding software 307 results in forwarding outcome 309. Software 307 has two main components: subscriber function (SUBSFUNC) 319, which does call forwarding for features applied to subscribers, and telephone function (TELFUNC) 321, which does call forwarding for features applied to telephones. As shown by the single arrows, both function 319 and 321 read feature data base 311 and read and write CSUBS 303; additionally, function 319 writes CTEL 305, which is read by function 321. Function 321 also reads CTELSTAT 313. As shown by the double arrows, function 319 recursively invokes itself (arrow 323) and also invokes function 321 (arrow 325), while function 321 invokes function 319 (arrow 327).

When a call is made to any telephone, subscriber function 319 is invoked for that telephone number; if that telephone number has a forwarding feature active, subscriber function 319 invokes itself recursively or invokes telephone function 321. Which is invoked depends on whether the forwarding feature applies to the telephone or the subscriber. Both invocations are made using the forwarded-to telephone number and the invocation is executed for that telephone number. Thus, if a number of telephone numbers are chained by call forwarding from one number to the next, there is a sequence of invocations of function 319 or 321, with each invocation corresponding to one forwarding step.

For example, in call forwarding arrangement 101, the call to telephone 103(1) invokes subscriber function 319 for that telephone's telephone number 1; CSUBS 303 is set to 1. Subscriber function 319 uses CSUBS 303 in feature data base 311 and determines that telephone number 1 has delegate forwarding to telephone 103(2) active. This type of forwarding is applied to subscribers, so subscriber function 319 recursively invokes itself with the telephone number 2. For this invocation, CSUBS 303 has that value. Continuing on the assumption that telephone 103(2) has a follow-me forwarding feature active which specifies telephone 103(3) as the forwarded-to telephone, that feature is applied to telephones, so subscriber function 319 invokes telephone function 321. In that invocation, CSUBS 303 has the value 3, which is the number of telephone 103(3), while CTEL 305 is set to the value 2, which is the number of telephone 103(2). As will be explained in more detail later, the result of this invocation, and thus forwarding outcome 309, is that telephone 103(3) is alerted.

In terms of actual implementation, when call forwarding software 307 is implemented in a system in which switches have access to a data base which indicates the kind of call forwarding feature (if any) which is currently associated with a given telephone number, call forwarding software 307 can use the current values of CSUBS 303 and CTEL 305 to query the data base and determine what call forwarding features are activated for the values of the variables.

In a more distributed environment, i.e., where the information about the telephone numbers and their associated call forwarding features is distributed throughout the telephone system, the device from which the call is being forwarded must send a message to the device to which the call is being forwarded which includes the kinds of call forwarding features currently associated with the device's telephone number. The device to which the call is being forwarded can then use the message, the kinds of call forwarding features which it itself currently has, and its own state to determine how to handle the forwarded call.

Formal Specification of Call Processing: FIG. 4

The starting point for the following discussion of call forwarding which is based on the situation for which the user activated call forwarding is finite state automaton 401 shown in FIG. 4. Automaton 401 shows some of the states, external events, and state transitions involved in call processing.

Although FIG. 4 is incomplete in many respects, it does include all out-transitions from the three large states, dialed 403, alerting 405, and timed_out 407. These states are what their names imply: in dialed, a telephone number (DN) has been dialed; in alerting, the telephone at the dialed number is alerting the user (e.g., the telephone is ringing); in timed-out, the user at the dialed telephone number has not responded within a set period of time. The smaller states are also what their names imply; in "blocked" 409, calls to the dialed telephone number have been blocked; in "busy" 411, the dialed telephone number is busy; in "abandoned" 413, the call has been abandoned by either of the parties or the system; and in "connected" 415, a connection has been established between the dialing telephone and the dialed telephone.

The arrows connecting the states indicate transitions between them. The dashed arrows 421 represent state transitions stimulated by computation in a switching system, while the solid arrows 417, 419, and 420 represent state transitions stimulated by external events. The external events include an abandon event 417, which occurs when either the caller, the callee, or the telephone system abandons the call, a timeout event 420, which occurs when a timer which controls the maximum length of time that the called number is in the alerting state runs out, and an answer event 419, which occurs when the user of the called telephone answers the telephone.

Which telephone numbers are placed in the states of FIG. 4 is determined by four relevant state variables, each of which represents a telephone number (DN): origin, dialed, tel, and subs.

origin contains the DN of the caller;

dialed contains the DN dialed by the caller;

Whenever the value of tel is defined, it is the DN whose telephone is the current target of routing; and Whenever the value of subs is defined, it is the DN whose subscriber is the current target of routing.

The first two values are defined by the call to which the routing function is being applied; they thus always exist and remain unchanged throughout the routing process. tel and subs are set and updated by subscriber function 319 and telephone function 321, and their values will thus depend on the stage of the routing process and the kinds of forwarding which have been applied to the call.

Transitions from dialed 403 are described by a function defined as dialing-outcome: DN→(call-state×DN×DN)

and transitions from timed-out 407 are described by a function defined as timeout-outcome: (DN×DN)→(call-state×DN×DN)

Both of these are total functions from their arguments to value triples. The last two components of each value triple must be DNs and the first component must be a call state, where call-state denotes the enumerated type call-state::=blocked|busy|alerting|quick-alerting Using these functions, we can describe what the system does in the dialed, alerting, and timed-out states, as follows.

In dialed state: Execute this pseudocode.

```
(new-state,tel,subs) := dialing-outcome (dialed);
if "abandon event has occurred" then "next state is abandoned"
    else if (new-state = blocked) then "next state is blocked"
    else if (new-state = busy) then "next state is busy"
    else if (new-state = alerting) then "next state is alerting
    else if (new-state = quick-alerting)
        then "next state is alerting and set alerting timer".
```

In alerting state: Alert the telephone whose DN is in tel. Transition to the next state is strictly based on external events, as shown in FIG. 1.

In timed-out state: Execute this pseudocode.

```
(new-state,tel,subs) := timeout-outcome (tel,subs);
if "abandon event has occurred" then "next state is abandoned"
    else if (new-state = blocked) then "next state is blocked"
    else if (new-state = busy) then "next state is busy"
    else if (new-state = alerting) then "next state is alerting
    else if (new-state = quick-alerting)
        then "next state is alerting and set alerting timer".
```

Formal Description of Call Forwarding: FIG. 5

Finite state automata such as automaton 401 are particularly adapted to describing the temporal aspects of call processing. However, most of the complexity of routing is nontemporal—it concerns static data and relationships. It is easier to understand routing features if their specification is separated from the temporal aspects of call processing and uses a syntax that is appropriate for managing static complexity. Accordingly, the following formal specification of call forwarding uses a form suitable for routing features.

The specification of call processing in automaton 401 and the following specification of call forwarding are both partial-neither one is complete in itself. The two partial specifications can be composed formally using multiparadigm specification techniques, as explained in Pamela Zave and Michael Jackson, "Conjunction as composition" *ACM Transactions on Software Engineering and Methodology II* (4):379–411, October 1993. For present purposes, however, an informal description of how the two specifications fit together will be sufficient.

The formal specification of call forwarding which follows is written in Z. The first step in specifying call forwarding is to set forth in Z which features apply to which telephone numbers. The features are the following:

POTS: plain old telephone service, which every telephone number has;

Del: unconditional delegate forwarding: all calls to the telephone number having the feature will be delegate forwarded;

FM: unconditional follow-me forwarding: all calls to the telephone number having the feature will be follow-me forwarded;

DelB: delegate on busy forwarding: calls to the telephone number having the feature will be delegate forwarded when the telephone number is busy;

DelNA: delegate on no answer forwarding: calls to the telephone number having the feature will be delegate forwarded when there is no answer; and FMNA: follow-me on no answer forwarding: calls to the telephone number having the feature will be follow-me forwarded when there is no answer.

The foregoing is expressed in Z as follows:

[DN, telephone]

POTS: DN→telephone

Del: DN↔DN

FM: DN↔DN

DelB: DN↔DN

DelNA: DN↔DN

FMNA: DN↔DN

The first line says that DN and telephone are primitive types of the specification. POTS, Del, FM, DelB, DelNA, and FMNA are all binary relations, or, in other words, sets of ordered pairs. The two different arrow symbols denote different constraints on these sets: a plain arrow is a total function, and a crossed arrow is a partial function. dom R denotes the domain of relation R. Thus $(d_1,d_2) \in R$ if and only if the ordered pair $(d_1,d_2)$ is a member of the relation R, and its membership implies that $d_1 \in$ dom R. For example, in POTS, all telephone numbers specify a telephone, while in unconditional delegate forwarding, only those telephone numbers which belong to the unconditional delegate forwarding domain specify another telephone number to which the call is to be unconditionally delegate forwarded.

If $(d_1,d_2)$ is a member of some forwarding relation $R_f$, then $d_1$ is forwarded to $d_2$ by means of the feature corresponding to $R_f$. The fact that $R_f$ is a function means that a DN $d_1$ can only be forwarded to one DN at a time by means of that feature. The fact that $R_f$ is a partial function means that a DN $d_1$ need not be forwarded; only those DNs in the domain of $R_f$ are being forwarded by means of that feature. As an extreme case of this, if a forwarding feature is not being offered to subscribers, then its corresponding relation is always empty.

The content of these relations changes over time, as a result of provisioning operations and control commands from telephones. There are only two restrictions on the updating of these relations: (1) Queries and updates must be synchronized in the usual way, so that they appear atomic and are actually serializable. (2) Integrity constraints on the relations must be preserved at all times.

There are relatively few integrity constraints in this specification. The functional nature of functional relations must be preserved. Also, the following constraint prevents a subscriber from forwarding calls to himself. The first line defines an aggregate relation, while the second line says that it must contain no pairs from the identity relation on DNs.

All-Forwards=Del∪FM∪DelB∪DelNA∪FMNA

All-Forwards∩id DN=∅

Another integrity constraint will be mentioned when it becomes relevant.

The call forwarding specification requires four functions. Two of these are the dialing-outcome and timeout-outcome functions defined above. As employed in this specification, those two functions use the other two functions: The other two functions are:

subscriber-outcome: DN→(call-state×DN×DN)

telephone-outcome: (DN×DN)→(call-state×DN×DN)

subscriber-outcome is an implementation of subscriber function 319 and telephone-outcome is an implementation of telephone function 321. The definitions of subscriber-outcome and telephone-outcome use themselves and each other in a highly recursive manner.

The definition of dialing-outcome in this specification is simply:

dialing-outcome(dialed)=subscriber-outcome(dialed)

The definitions of the other three functions have several cases, so they are presented in tables 501, 503 and 505 of FIG. 5. These tables make case analysis more readable. They are not part of Z, but can be translated automatically into Z, and so can be regarded as a shorthand.

The top row of each table supplies names for all the formal parameters of the function, both incoming and outgoing. Each subsequent row of the table covers another numbered case, the second column giving the condition under which the case applies, and the third column giving the value of the function in that case. The cases in each table are meant to be read from top to bottom. Thus each condition should be understood as including, implicitly, the negations of all previous conditions in the table. The order of the conditions in the table therefore also determines priorities among call forwarding features when more than one feature is activated for a telephone number. For instance, if both unconditional delegate forwarding and unconditional follow-me forwarding are activated, table 501 says that the call will be forwarded according to unconditional delegate forwarding, since case 1 will be true and will be executed, and that will preclude the execution of case 2.

The following line of Z means that Busy is specified as a set of telephones:

Busy: ℙtelephone

At any time, the set Busy contains all the telephones that are currently busy. (This is typical of the Z specification style.)

Each recursive evaluation of subscriber-outcome or telephone-outcome in the tables of FIG. 5 corresponds to a forwarding step, and the argument substitutions have the effect of updating the routing destination at each step. It is important to note, however, that the function definitions maintain two separate routing destinations, the telephone being routed to (tel) and the subscriber being routed to (subs). Follow-me forwarding distinguishes these two, so manipulating them separately is the only way to do follow-me forwarding correctly.

Every time a version of delegate forwarding is applied, the function subscriber-outcome is evaluated with the DN of the newly delegated subscriber as its argument. This function checks for further unconditional delegate or follow-me forwarding.

Whenever routing reaches a phase in which the status of a particular telephone is relevant, the function telephone-outcome is evaluated with the current telephone destination and subscriber destination as its arguments. This function checks the telephone for unavailability. If available then the telephone will be alerted; if no-answer forwarding could apply then the alerting must be quick.

timeout-outcome is only evaluated after quick alerting and a timeout. Because of this history, it would be reasonable to assume that Cases 1 and 2 of Table 505 are exhaustive. However, it is important to realize that the same atomic queries of the relations DelNA and FMNA before and after quick alerting might conceivably yield different results, because the relations might have changed during that interval of time! This situation will be rare, but formal specifications cannot ignore any possibilities. Case 3 in Table 505 takes care of it.

We might impose on the forwarding relations the following integrity constraint:

All-Delegates=Del∪DelB∪DelNA

All-Delegates⁺∩id DN=∅

This constraint in Z says that it is impossible, beginning with a DN and transforming it successively by means of delegation steps, to get back to the original DN.

The examples of FIGS. 1 and 2 can serve to show how the tables of FIG. 5 work. Beginning with FIG. 1, the telephone system receives a call for telephone 1 103(1), which has delegate forwarding to telephone 2 103(2). The call was initiated using dialing-outcome(1), i.e., dialed's value is the telephone number of telephone 1. The telephone system responds by invoking the function subscriber-outcome(1).

Table 501 is the table for that function. What happens depends on the domain of the value of (old-subs), which is the function's formal parameter. in this case, (old-subs) is equal to 1. We know from FIG. 1 that phone number 1 has unconditional delegate forwarding activated, so case 1 applies. In that case, subscriber-outcome(2) is invoked, since 2 is the telephone number to which the unconditional delegate forwarding is to forward the call. As a result of the invocation, the call is forwarded to telephone 2.

We will first presume that telephone 2 has unconditional delegate forwarding. Thus, old-subs belongs to the domain of delegate forwarding and case 1 of table 501 applies. Accordingly, the call is forwarded to telephone 3 103(3), using subscriber-outcome(3). Telephone 3 has no call forwarding, so for that telephone, case 3 of subscriber-outcome holds. In that case, telephone-outcome(3,3) is executed. Table 503 shows the various possibilities. In this execution, old-subs has no call forwarding feature associated with it and telephone 3 is not busy. Consequently, the only case which applies is case 5 and the telephone system places telephone 3 in the alerting state.

Now we will presume that telephone 2 has unconditional follow-me forwarding to telephone 3. This time, old-subs belongs to the domain of follow-me forwarding and the call is forwarded to telephone 3 by means of an execution of telephone-outcome(3,2). Again, the only case of table 503 which applies is case 5 and the telephone system places telephone 3 in the alerting state.

Figure 6:
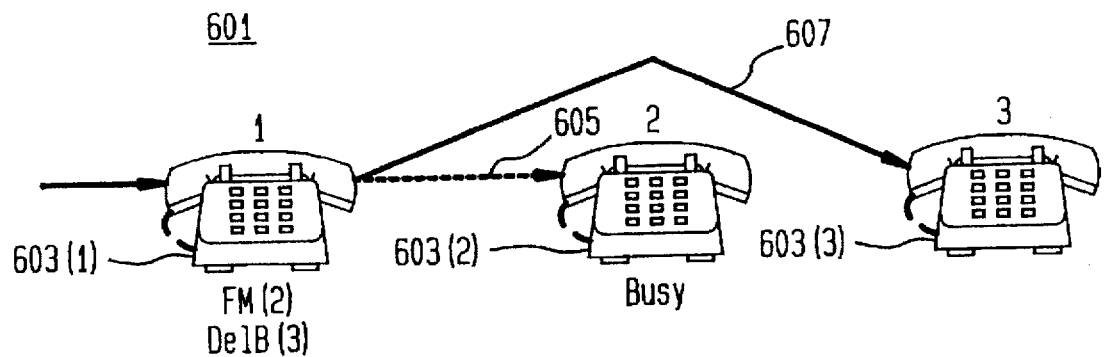
FIG. 6.

FIG. 6 provides an example of a more complicated situation. In call forwarding arrangement 601, telephone 603(1) has follow me forwarding (FM(2)) activated to telephone 603(2) and delegate-busy forwarding (Del B(3)) activated to telephone 3. Telephone 603(2) is busy. The forwarding begins with the invocation subscriber-outcome (1), old-subs equals 1, which belongs to the FM domain, so case 2 of table 501 is executed. That results in the invocation telephone-outcome(2,1), since telephone 2 is specified as the target for follow-me forwarding. With this invocation, old-tel equals 2 and old-subs equals 1, which also belongs to the DelB domain. An attempt to route to telephone 603(2) is represented by dashed line 605. Since telephone 2 is busy, the conditions of case 1 of table 503 are satisfied. The invocation subscriber-outcome(3) results. With this invocation, old-subs is equal to 3 and belongs neither to the Del domain nor to the FM domain, so case 3 of table 501 is executed, resulting in the invocation telephone-outcome(3, 3). Telephone number 3 is not busy and has no call forwarding features activated, so it case 5 of table 503 is satisfied and the phone call is transferred to telephone 603(3) as shown by line 607.

Figure 7:
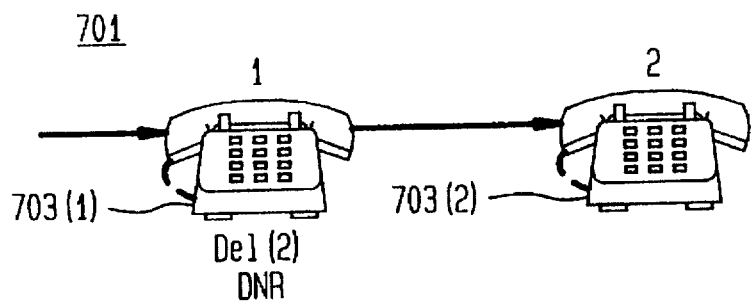
FIG. 7.
Figure 8:
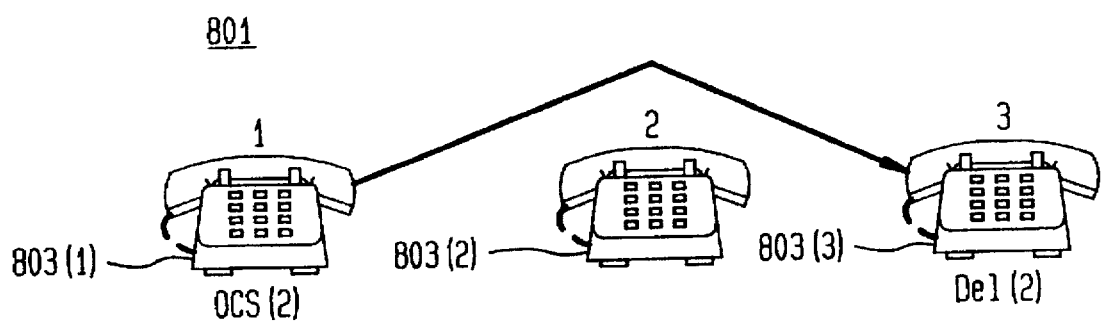
FIG. 8.

Situational Analysis of Call Blocking Features: FIGS. 7-9

Analysis like that used above to simplify and rationalize call forwarding features can also be applied to call blocking features. These features are routing features that prevent the completion of calls when they are considered undesirable by one of the people involved. An example of a call blocking feature is one which when activated bars users of a telephone from making calls to certain other telephone numbers. Call blocking features and their interactions with call forwarding features become understandable when the call blocking features are analyzed from the point of view of whether the person who activates the feature intends it to block calls to a given subscriber or to a given telephone.

The following table provides a representative sample of call blocking features. All of the features in the table will be specified formally below.

| feature name | feature description | alternative names |
|---|---|---|
| Originating Call Screening (OCS) | block outgoing calls to certain DNs | Outgoing Call Barring Call Restriction |
| Terminating Call Screening (TCS) | block incoming calls from certain DNs | Incoming Call Barring Selective Call Rejection |
| Do Not Ring (DNR) | do not alert this telephone | |
| Vacation Protection (VP) | do not connect calls for this subscriber | |
| Calling Number Delivery Blocking (CNDB) | refuse to allow caller identification on outgoing call | |
| Anonymous Call Rejection (ACR) | block incoming calls having no caller identification | |

Each of the above blocking feature can be defined in terms of a relation recording which DNs it applies to. In Z the relations are declared as follows:

OCS: DN←—→DN

TCS: DN←—→DN

DNR: ℙDN

VP: ℙDN

CNDB: ℙDN

ACR: ℙDN

A double-headed arrow indicates an unconstrained binary relation. If $(d_1,d_2)$ is a member of some call screening relation $R_r$, then calls from $d_1$ to $d_2$ are prohibited by means of the feature corresponding to $R_r$. For example, if OCS is activated for a given telephone number $d_1$, there will be a pair $(d_1,d_i)$ for each $d_i$ to which outgoing calls from $d_1$ are prohibited.

ℙDN indicates a unary relation, that is, a set of DNs. Thus, DNR, VP, CNDB, and ACR are all unary relations or sets of DNs. If a DN d is a member of one of these sets, then the corresponding feature applies to d. Thus, a telephone whose number belongs to the set of telephone numbers for DNR should not be alerted.

The formal specification of blocking relies on three aggregate relations, defined as follows:

$$\text{Block-Telephone}=(DN\times DNR)\cup(CNDB\times ACR)$$

$$\text{Block-Subscriber}=(DN\times VP)$$

$$\text{Block-Route-Through}=OCS\cup TCS$$

(DN×DNR) is a binary relation containing all ordered pairs of DNs in which the first element belongs to DN and the second element belongs to DNR. (CNDB×ACR) is a binary relation containing all ordered pairs of DNs in which the first element belongs to CNDB and the second element belongs to ACR.

Block-Telephone contains all pairs $(d_1,d_2)$ such that a call from $d_1$ should be blocked if it is routed to the telephone of $d_2$. Block-Subscriber contains all pairs $(d_1,d_2)$ such that a call from $d_1$ should be blocked if it is routed to the subscriber of $d_2$. Block-Route-Through contains all pairs $(d_1,d_2)$ such that a call from $d_1$ should be blocked if the telephone or subscriber of $d_2$ appears anywhere in its routing path. If a pair $(d_1,d_2)$ is in Block-Route-Through, then its presence or absence in Block-Telephone has no effect, because any call blocked by the presence of the pair in Block-Telephone or Block-Subscriber is also blocked by its presence in Block-Route-Through FIG. 7 shows how the Block-Telephone, Block-Subscriber and Block-Route-Through aggregate relations can be used to solve example 2 of the Description of the Prior Art, in which a customer has activated both call forwarding and do not ring. In call routing arrangement 701 of FIG. 7, telephone 703(1) has an unconditional delegate feature activated which forwards calls to telephone 703(2) and also has DNR activated. In the case of DNR, the feature also applies to telephone 703(1). In the call to telephone 703(1), the originating number and the number of telephone 703(1) form a pair that belongs to (DN×DNR), which in turn belongs to Block-Telephone. However, the unconditional delegate feature is a subscriber feature, not a telephone feature, and so the call to telephone 703(1) will not ring telephone 703(1), but will be forwarded to telephone 703(2).

FIG. 8 shows how Block-Telephone, Block-Subscriber, and Block-Route-Through can be used to solve example 3 of the Description of the Prior Art, in which a customer has activated outward call screening, the customer's child has a friend activate call forwarding from the friend's telephone to one of the forbidden telephone numbers, and the child then calls the friend's telephone. In routing arrangement 801, telephone 803(1) has OCS screening which applies to telephone 803(2) and so forbids calls to telephone 803(2). For this reason, the pair (1,2) belongs to the relation OCS. In telephone 803(3), unconditional delegate forwarding to telephone 2 has been activated. Since the call to telephone 3 comes from telephone 1 and forwarding it to telephone 2 would establish a connection between the pair (1,2), the telephone system does not forward the call.

The problem posed in Example 2 of the Description of the Prior Art is properly solved if it is understood that DNR is a telephone feature, not a subscriber feature. That being the case, Block-Telephone contains (DN×DNR), which is a binary relation containing all ordered pairs of DNs in which the second element belongs to DNR. Thus, any call which is made or forwarded to a telephone number for which DNR has been activated will be blocked.

The VP feature is new. It is a subscriber feature, not a telephone feature. (DN×VP) is therefore part of Block-Subscriber rather than Block-Telephone. When VP is activated for a telephone number the feature applies to the telephone number. Calls to the telephone will therefore be blocked if they are directed to the subscriber, but will not be blocked if they are directed to the telephone. VP might be used by a person who is going on vacation and does not want to return to a huge accumulation of messages. If VP applies to his DN, then no calls routed to him as a subscriber (for example, via delegate forwarding) will be connected. At the same time, his housesitter will receive calls at his telephone which have been routed from the housesitter's own telephone number by follow-me forwarding activated at that number.

Block-Telephone also contains (CNDB×ACR), which is a binary relation containing all ordered pairs of DNs in which the first element belongs to CNDB and the second element belongs to ACR. This ensures that anonymous calls to DNs to which ACR applies will be blocked. The relation is part of Block-Telephone because both the ACR feature and the Calling Number Delivery (CND) features are necessarily applied to particular telephones. It makes no sense to subscribe to CND if you do not own a telephone capable of displaying the caller identification, and it makes no sense to subscribe to ACR if you do not subscribe to CND.

The key to implementing blocking based on the relations in Block-Telephone and Block-Subscriber is again the tel and subs DNs. As employed in call forwarding, these variables are updated at every routing step and thus always indicate which telephone numbers are currently filling the roles of destination telephone and destination subscriber, respectively. By using that information, it is possible to specify blocking features that are, like the forwarding features, tailored precisely to meet human needs.

It is in fact possible to implement the call blocking features described above by simply adding lines to tables 501 and tables 503 of FIG. 5. The new tables are shown in FIG. 9. Table 901 is table 501 with new cases 905 and 907 added 1 to handle call blocking in the context of the subscriber-outcome function. Similarly, table 903 is table 503 with new cases 909 and 911 added to handle call blocking in the context of the telephone-outcome function.

When a call is processed in arrangement 701 of FIG. 7 according to the tables of FIG. 9, processing proceeds as follows: The call to telephone 703(1) sets the origin variable to the telephone number n of the telephone used to call telephone 1 and results in the invocation subscriber-outcome (1). In the execution of subscriber-outcome(1), the relevant case in table 901 is 2, so the result is the recursive invocation subscriber-outcome(2), which forwards the call to telephone 703(2). In the execution of that invocation, no features are activated, so case 5 of table 901 applies, which in turn resolves to case 7 of table 903, in which telephone 703(2) is alerted.

Processing the call in arrangement 801 of FIG. 8 according to the tables of FIG. 9 proceeds as follows: the call from telephone 803(1) to telephone 803(3) sets the origin variable to 1 and results in the invocation subscriber-outcome(3). Since telephone 803(3) has unconditional delegate call forwarding to telephone 803(2) activated, case 2 of table 901 applies and the result is the invocation subscriber-outcome (2). In the execution of this invocation, the pair (origin, old_subs) has the value (1,2) and because OCS was activated for telephone 803(1) and applied to the number of telephone 803(2), the pair belongs to Block-Route-Through, case 1 of table 901 applies, and the call is blocked.

It should be noted here that because the tables define their blocking conditions in terms of the aggregate blocking relations Block-Route-Through, Block-Subscriber,, and Block-Telephone, the specification is more extensible than it would be if the tables used the feature relations directly. When a new blocking feature is proposed, there is a good chance that it can be added by modifying the aggregate relations alone, without touching the tables.

Implementing Routing In Finite-State Automata

To implement routing in finite state automata for call processing like automaton 401 of FIG. 4, one need simply embed evaluations of the routing functions in the transitions of the finite-state automaton for call processing. The feature relations are used by the routing view and updated as required for provisioning and management of subscriber data. The routing functions update the variables tel and subs and the variables can be used by feature specifications that need to know which DNs are playing the roles of destination telephone and destination subscriber.

For example, in the case of a collect call, the destination subscriber—not destination telephone—should be billed. If a subscriber receives a call at someone else's telephone by means of follow-me forwarding, and accepts the charges, it seems only fair to bill the responsible subscriber rather than his helpless host. In the case of automatic retry (of a call to a busy telephone), the destination telephone should be monitored and retried, because that is the telephone whose busy state invoked the feature.

Conclusion

The foregoing Detailed Description has disclosed to those skilled in telephony a new technique for analyzing call routing features from the point of view of the situation of the person activating the feature and has disclosed results of such analysis including A new class of follow-me call forwarding features which includes the unconditional follow me feature and the follow me no answer feature;

A new class of call blocking features which block calls to subscribers, including the vacation protection feature; and An improved understanding of the manner in which call routing features ought to interact.

The Detailed Description has also disclosed the best mode known to the inventor of implementing call forwarding based on situational analysis. Features of the implementation include The use of the telephone number originating the call, the telephone number representing the subscriber who is the current target of the routing, and the telephone number representing the telephone which is the current target of the routing to control the routing computation;

The use of a first subscriber function to perform routing when the feature is one which is applied to a subscriber and a second telephone function to perform routing when the feature is one which is applied to a telephone; and The use of recursive invocations of the subscriber function and the telephone function to compute routing, with each invocation of one of the functions being the next step in a chain of forwarded calls.

As pointed out in the Specification, the kind of analysis disclosed herein can be used to develop new features whose behavior is governed by the concepts disclosed herein. Moreover, it will be apparent to those skilled in telephony that other versions of the disclosed features are possible and that many other implementations of the disclosed features are possible.

That being the case, the Derailed Description is to be regarded as being in all respects exemplary but not restrictive and the scope of the invention is not to be determined from the Detailed Description but rather from the appended claims as interpreted with the full breadth permitted by the patent laws.

What is claimed is:

1. A method of routing calls which is employed in a telephone system employing a plurality of telephone numbers, wherein a telephone number has associated therewith a telephone and a subscriber and wherein a call routing operation may comprise one or more routing steps, each routing step utilizing at least one predetermined call routing feature, wherein call routing features are classified into first features which are related to subscribers represented by their associated telephone numbers and second features which are related to telephones represented by their associated telephone numbers, the method comprising the steps of:

in a routing step of the call routing operation, determining whether each predetermined call routing feature which is utilized in the routing step is classified as one of the first features or one of the second features; and determining how a call associated with the routing operation is to be routed in the routing step according to how the call routing features associated with the routing step are classified.

2. The method set forth in claim 1 wherein:
a feature which is associated with the routing step is activated for the telephone number from which the routing step is being performed.

3. The method set forth in claim 1 wherein:
there is a plurality of features which are associated with the routing step; and
the features which are associated include a feature which is activated for a telephone number from which an earlier routing step was performed.

4. The method set forth in claim 3 wherein:
the telephone number from which an earlier routing step was performed is the telephone number at which the call originated.

5. The method set forth in claim 3 wherein:
the telephone number from which an earlier routing step was performed is the telephone number from which the immediately preceding routing step was performed.

6. The method set forth in claim 1 wherein:
the first features include a first call blocking feature which blocks calls to the subscriber represented by the telephone number to which the call blocking feature is applied;
the second features include a first call forwarding feature which forwards calls to the telephone represented by the telephone number to which the call forwarding feature is applied;
the step of determining feature classification determines that the first call forwarding feature is activated for a first telephone number from which the routing step is being performed and that the first call blocking feature is activated for a second telephone number to which the routing step is to route the call; and
the step of determining how the call is to be routed determines that the call is to be routed to the second telephone number.

7. The method set forth in claim 1 wherein:
the first features include a first call forwarding feature which forwards calls to the subscriber represented by the telephone number to which the call forwarding feature is applied;
the second features include a second call forwarding feature which forwards calls to the telephone represented by the telephone number to which the second call forwarding feature is applied;
the step of determining feature classification determines that the second call forwarding feature is activated for a first telephone number from which the routing step is being performed and that the first call forwarding feature is activated for a second telephone number to which the routing step is to route the call; and
the step of determining how the call is to be routed determines that the call is to be routed to the second telephone number, but no further from the second telephone number.

8. The method set forth in claim 1 wherein:
the first features include a first call forwarding feature which forwards calls to the subscriber represented by the telephone number to which the call forwarding feature is applied in response to a busy signal;
the second features include a second call forwarding feature which forwards calls to the telephone represented by the telephone number to which the second call forwarding feature is applied;
the step of determining determines that first and second call forwarding features are activated for a first telephone number from which the routing step is being performed; and
the step of determining how the call is to be routed first routes the call to a first telephone number specified by the activated second call forwarding feature and then responds to a busy signal from the first telephone number by routing the call to a second telephone number specified by the activated first call forwarding.

9. A method of forwarding a telephone call in a telephone system wherein a call may be forwarded through a plurality of telephone numbers, the method comprising the steps of:

making a determination from information in the telephone system whether calls forwarded from a current one of the plurality of telephone numbers are intended to be forwarded to a telephone instrument associated with a next telephone number or a subscriber associated with said next telephone number; and forwarding the calls to the telephone instrument associated with the next telephone number but no further from the next telephone number when the determination yields that the calls are to be forwarded to the telephone instrument rather than the subscriber.

10. The method set forth in claim 9 wherein:

the step of forwarding forwards the call unconditionally.

11. The method set forth in claim 9 wherein:

the step of forwarding forwards the call in further response to a condition of the line associated with the current one of the plurality of telephone numbers.

12. The method set forth in claim 11 wherein:

the condition of the line is a failure to answer the telephone associated therewith.

13. The method set forth in any of claims 9 through 12 wherein:

the information in the telephone system further indicates that calls forwarded from the current one of the plurality of telephone numbers are also intended to be forwarded to another telephone number if the next telephone number is busy; and the step of forwarding forwards the call to the other telephone number when the next telephone number is busy.

14. A method of blocking a call from a first telephone number to a second telephone number, the first telephone number and the second telephone number being a pair of telephone numbers, wherein there is a set of pairs of telephone numbers, each pair including an originating telephone number and another telephone number, whereby a feature activated for a telephone number of one of the pairs in the set requires that calls from the originating telephone number of that pair to said another telephone number of that pair be blocked and the method being employed when said second telephone number is reached from the first telephone number forwarding through one or more telephone numbers, the method comprising the steps of:

maintaining the first telephone number during a call forwarding operation that includes forwarding a call to at least one call forwarding destination; and for each telephone number corresponding to a call forwarding destination in the forwarding operation, comparing a pair of phone numbers, including the first telephone number and call forwarding destination telephone number, to the set of pairs of telephone numbers, and when finding a matching pair in the set, blocking the call.

15. The method set forth in claim 14 wherein:

the activated feature is activated for the second telephone number and which blocks calls to said second telephone number from the first telephone number.

16. The method set forth in claim 14 wherein:

a first activated feature is activated for the first telephone number which blocks delivery of the first telephone number to a third telephone; and a second activated feature is activated for said second telephone number which rejects calls which do not deliver the first telephone number.

17. Apparatus for routing calls in a telephone system, the apparatus comprising:

a memory in the telephone system storing information which relates telephone numbers belonging to the telephone system to call routing features, the call routing features being classified into first features which are applied to telephone numbers which represent subscribers and second features which are applied to telephone numbers which represent telephones; and a call router which for each routing step determines whether each feature which is relevant to the routing step is one of the first features or one of the second features and determines how the call is routed according to how the relevant features are classified.

18. The apparatus set forth in claim 17 wherein:

the feature which is associated with the routing step is activated for the telephone number from which the routing step is being performed.

19. The apparatus set forth in claim 18 wherein:

there is a plurality of features which are associated with the routing step; and the features which are associated include a feature which is activated for a telephone number from which an earlier routing step was performed.

20. The apparatus set forth in claim 19 wherein:

the telephone number from which an earlier routing step was performed is the telephone number at which the call originated.

21. The apparatus set forth in claim 19 wherein:

the telephone number from which an earlier routing step was performed is the telephone number from which the immediately preceding routing step was performed.

22. The apparatus set forth in claim 17 wherein:

the first features include a first call blocking feature which blocks calls to the subscriber represented by the telephone number to which the call blocking feature is applied;

the second features include a first call forwarding feature which forwards calls to the telephone represented by the telephone number to which the call forwarding feature is applied; and the call router determines that the first call forwarding feature is activated for a first telephone number from which the routing step is being performed and that the first call blocking feature is activated for a second telephone number to which the routing step is to route the call and thereupon routes the call to the second telephone number.

23. The apparatus set forth in claim 17 wherein:

the first features include a first call forwarding feature which forwards calls to the subscriber represented by the telephone number to which the call forwarding feature is applied;

the second features include a second call forwarding feature which forwards calls to the telephone represented by the telephone number to which the second call forwarding feature is applied;

the call router determines that the second call forwarding feature is activated for a first telephone number from which the routing step is being performed and that the first call forwarding feature is activated for a second telephone number to which the routing step is to route the call and thereupon routes the call to the second telephone number but no further from the second telephone number.

24. The apparatus set forth in claim 17 wherein:

the first features include a first call forwarding feature which forwards calls to the subscriber represented by the telephone number to which the call forwarding feature is applied in response to a busy signal;

the second features include a second call forwarding feature which forwards calls to the telephone represented by the telephone number to which the second call forwarding feature is applied;

the call router determines that first and second call forwarding features are activated for a first telephone number from which the routing step is being performed and thereupon first routes the call to a first telephone number specified by the activated second call forwarding feature and then responds to a busy signal from the first telephone number by routing the call to a second telephone number specified by the activated first call forwarding feature.

25. The apparatus set forth in any one of claim 17 through 24 wherein:

the router is implemented in a device in the telephone system and determines how the associated features are classified by accessing the information.

26. The apparatus set forth in any one of claims 17 through 24 wherein:

the information is distributed among call routing devices; and the router receives call forwarding messages from which the router determines how the associated features are classified by accessing the information.

27. Apparatus for blocking a call in a telephone system which is capable of routing the call via a call forwarding operation through one or more telephone numbers, the apparatus comprising:

a set of pairs of telephone numbers stored in the telephone system, each pair including an originating telephone number and another telephone number, each pair being such that a feature activated for a telephone number of the pair requires that calls from the originating telephone number to said another telephone number to be blocked; and a router for routing the call to at least one call forwarding destination, the router operating to keep track of an originating telephone number for the call during the call forwarding operation and a telephone number for each call forwarding destination in the call forwarding operation, the router also determining whether a pair of telephone numbers, including said maintained originating telephone number and one of the call forwarding destination telephone numbers, matches one of the pairs in said set having said feature activated, and when that is the case, blocking the call.

28. The apparatus set forth in claim 27 wherein:

the activated feature is activated for said another telephone number of the pair and blocks calls to said another telephone number from the originating telephone number of the pair.

29. The apparatus set forth in claim 27 wherein:

a first activated feature is activated for a first pair of the set such that it blocks delivery of the originating telephone number of the pair to said another telephone number of the pair; and a second activated feature is activated for a second pair of the set such that said another telephone number of said second pair rejects calls which do not deliver the originating telephone number of said second pair.

30. A method of determining in a telephone system how a telephone call is to be routed by a call routing feature which has been activated for a current directory number, the directory number having associated therewith a subscriber and a telephone instrument, the method comprising the steps of:

making a determination of whether the call routing feature is defined in relationship to a subscriber represented by the directory number to which the feature is to be applied or a telephone instrument represented by the directory number to which the feature is to be applied; and depending on the determination, computing the call routing as required for the feature related to the subscriber; or computing the call routing as required for the feature related to the telephone instrument.

31. The method set forth in claim 30 wherein:

the telephone system maintains a subscriber directory number and a telephone directory number for use in routing the telephone call, the subscriber directory number representing a subscriber who is a target of the routing and the telephone directory number representing a telephone instrument which is a target of the routing;

the step of computing the call routing as required for the feature related to the subscriber employs the subscriber directory number but not the telephone directory number; and the step of computing the call routing as required for the feature related to the telephone instrument employs both the subscriber directory number and the telephone directory number.

32. The method set forth in claim 31 wherein:

the telephone system further maintains an origin directory number for use in routing the call, the origin directory number being the directory number from which the call originated; and the step of computing the call routing as required for the feature related to the subscriber employs the subscriber directory number and the origin directory number to determine whether the call is to be blocked; and the step of computing the call routing as required for the feature related to the telephone instrument employs the telephone directory number and the origin directory number to determine whether the call is to be blocked.

33. The method set forth in claim 30 wherein the step of computing the call routing as required for the features related to the telephone instrument further includes the step of:

computing the routing for a feature which depends on the present condition of the telephone line corresponding to the current directory number.

34. The method set forth in any of claims 30 through 33 wherein:

the current directory number is one of a plurality of telephone numbers through which the call has been routed; and the steps of the method are performed for each one of the plurality of telephone numbers, each one of the plurality of telephone numbers being the current telephone number when the steps are performed therefor.

35. The method set forth in claim 34 wherein:

the step of computing the call routing as required for the feature related to the subscriber is performed by a first recursive function;

the step of computing the call routing as required for the feature related to the telephone instrument is performed by a second recursive function; and the call is routed through the plurality of telephone numbers by recursively invoking the first and second functions as required for the features controlling the routing, each recursive invocation being done for one of the plurality of telephone numbers.

* * * * *